3,093,873
MOLDING METHOD AND APPARATUS
Charles R. McFall and Vernon M. Eads, Johnson City, Tenn., assignors to Johnson City Foundry and Machine Works, Inc., Johnson City, Tenn., a corporation of Tennessee
Filed Jan. 31, 1961, Ser. No. 86,159
5 Claims. (Cl. 22—131)

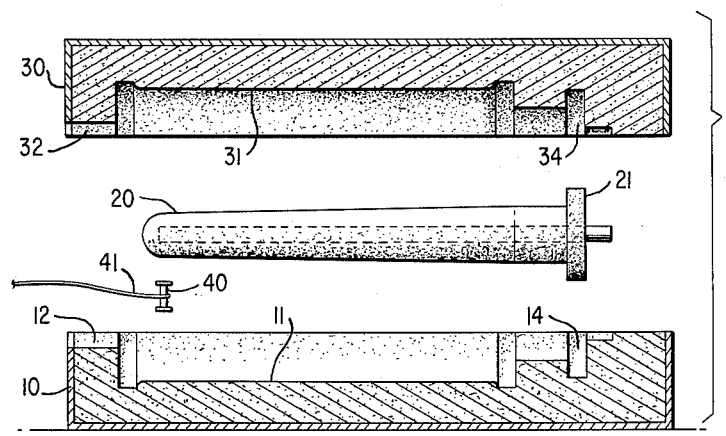
FIG.1
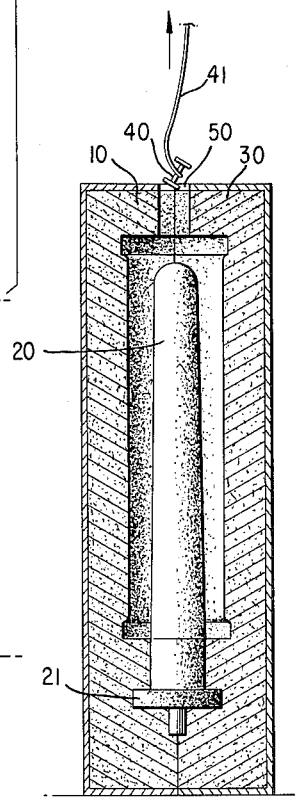
FIG.2
FIG.3
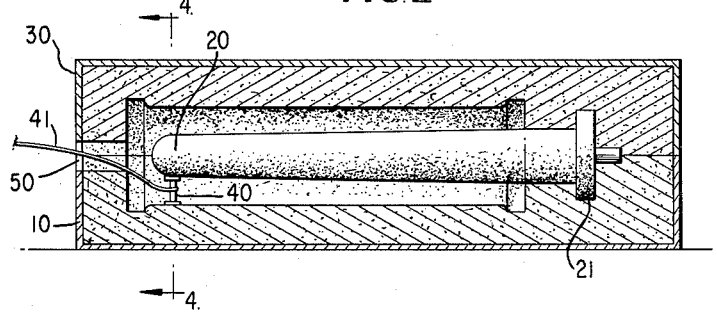
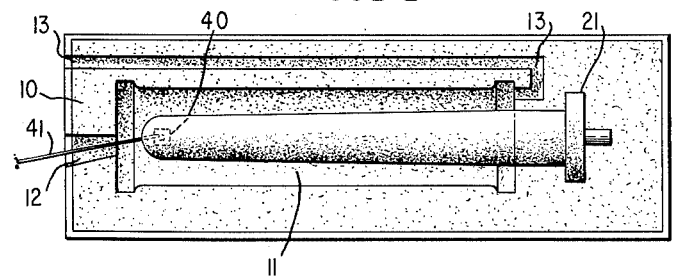
FIG.5
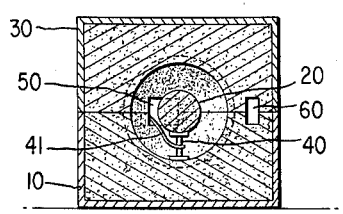
FIG.4
INVENTORS
CHARLES R. McFALL
BY VERNON M. EADS
ATTORNEYS

This invention relates to a method and apparatus for molding a hollow article, and more particularly to a method for molding an article by the use of a removable chaplet.

Molding apparatus used in foundry practice customarily includes the drag or lower part of the mold which forms an article-defining cavity together with the cope, or upper part of the mold. When a hollow is to be produced in the cast part, a solid core must be placed within the cavity and supported with suitable spacing from the walls of the cope and drag. After the drag is prepared, the core may be located with respect to the drag half of the mold cavity by means of a chaplet. The chaplet may be placed between the side wall of the mold cavity and the core, thereby supporting the latter with the desired spacing from the mold walls. After the cope or other parts of the mold are assembled, and it is desired to pour molten metal or similar molding material into the mold, it is impossible, in the usual practice of the prior art, to recover the chaplets. They are therefore surrounded by the poured metal, and become a part of the finished product. Thus, in addition to the disadvantage of losing one or more chaplets, as necessary in each instance, a further disadvantage of the usual prior art method resides in the fact that the existence of one or more chaplets in the finished cast part results in a non-homogeneous casting, so that the finished part may have surface imperfections which must be machine-finished, and, in addition, may even be structurally less strong than a homogeneous casting.

An object of this invention is to provide an improved molding method and apparatus for forming hollow articles employing a core and a removable chaplet.

Another object is to provide such a method and apparatus in which the chaplet is recovered for reuse and the cast part is rendered homogeneous.

Briefly, and in accordance with one aspect of my invention, the cope and drag of the mold of this invention are cooperatively formed with passage means connecting the mold cavity with the exterior of the mold. Before placing the cope and drag together, the core which defines the hollow of the finished article is located generally horizontally within the recess of the drag which forms one portion of the mold cavity. The core is supported spaced from the wall of the recess by a chaplet. The cope is added to the drag and the mold thus formed is rotated until the core is upright. When the core is upright, the chaplet no longer supports the weight of the core. Suitable means is provided to connect the opposite end of the core to the mold to maintain the core in its upright position. Thus the chaplet may be drawn out through the passage means by suitable slim means attached to it. The mold may then be filled with molding material to form a finished article unadultered by the inclusion of the chaplet.

Further objects, features and attending advantages of the invention will become apparent by reference to the following detailed description and the accompanying drawings in which:

FIGURE 1 is an exploded section in side elevation of the drag, cope, core, and chaplet in their relative positions prior to being stood upright, FIGURE 2 is a view similar to that of FIGURE 1 with the parts assembled, FIGURE 3 is a plan view of the drag with the core and chaplet set in place, FIGURE 4 is a view taken on line 4—4 of FIGURE 2, FIGURE 5 is a view similar to FIGURE 2, with the mold stood upright.

With reference to FIGURE 1, there is shown a drag 10 having formed therein a recess 11 defining half of the mold cavity. A core 20 having a flange 21 defines the hollow of the molded article to be formed. A chaplet 40 has attached thereto a suitable cord or wire 41. The cope 30 has formed therein a recess 31 forming the other half of the mold cavity in cooperation with recess 11. Drag 10 has a channel 12 cooperating with a similar channel 32 of cope 30.

With reference to FIGURE 2, drag, core, chaplet, and cope are in their assembled relation, with the chaplet 40 supporting core 20. Recessed channels 12 and 32 of the drag and cope, respectively, form a vent or "riser" 50 in the completed mold body. With reference to FIGURE 3, the drag 10 has formed therein a recessed channel 13 beginning at the same end of the drag 10 as recessed channel 12 and extending along the length of the drag to just beyond the end of recess 11, at which point it enters and joins recess 11. It will be understood that cope 30 is provided with a similar channel recess which registers with channel 13 when the cope and drag are placed together. Thus, channel 13 of the drag, together with the similar channel in the cope, cooperatively form an inlet sprue or "gate" 60, best seen in FIGURE 4, through which molten metal or similar mold material may enter the mold cavity.

By reference to FIGURES 2 through 5, it may be seen that, in assembling the mold initially, the cord or wire 41 is disposed to pass through the vent or riser 50, which is sufficiently large to permit chaplet 40 to be withdrawn therethrough.

With reference to FIGURES 1 through 3 and 5, it will be seen that both drag 10 and cope 30 are provided with recesses 14 and 34, respectively, which accommodate flange 21 of core 20 when the mold members are assembled. As best seen in FIGURE 5, flange 21, embedded in the mold body, provides sufficient support and balance to retain core 20 against displacement when the mold is stood upright, so that chaplet 40 is no longer needed to support the core with respect to the sides of the mold cavity. The foundry sand which normally defines the cavity in the mold, however, does not provide sufficient strength to retain the core in a horizontal position without the aid of the chaplet.

After the mold has been completely set up, as illustrated in FIGURES 2 and 4, it is stood upright, as shown in FIGURE 5. As described above, core 20 now rests on its longitudinal axis and is supported and balanced by flange 21 imbedded in the mold body. Chaplet 40 no longer supports a portion of the weight of core 20, and may now be withdrawn through the vent or riser 50 by means of the cord 41. Upon pouring of molding material such as molten metal into the cavity by way of sprue or gate 60, the molten metal completely fills the mold cavity unobstructed by the chaplet.

In view of the foregoing it will be apparent to those skilled in the art that the instant invention provides a means of molding an article by the use of a chaplet, thereby obtaining accuracy in the location of the core and, therefore, the hollow of the finished article, while at the same time permitting recovery of the chaplet for reuse. Moreover, the finished article is homogeneous and free of structural or surface defects caused by a chaplet of relatively foreign material being cast integrally with the article.

Although the foregoing specific embodiment has been illustrated and described, it is apparent that other changes and modifications may be made in the construction and arrangement of the various parts without departing from the scope of the invention as defined by the appended claims.

We claim:
1. A method of molding a hollow article comprising the steps of positioning a mold drag having therein one portion of an article-defining cavity, placing generally horizontally within said first cavity portion a mold core, supporting said core at a first end thereof by a removable chaplet having slim pulling means attached thereto of sufficient length to extend to the exterior of said mold, supporting said core at a second end thereof by means preventing displacement of said core when said core is stood upright, placing a mold cope having therein a second portion of said article-defining cavity against said drag to form a complete mold with said slim means extending through an opening in said mold, rotating said mold to stand said core upright, removing said chaplet through said passage by said slim means, and introducing molding material into said cavity.

2. The method as recited in claim 1 wherein said means for preventing displacement of said core includes a flange on said core and imbedded in said cope and drag.

3. An apparatus for molding a hollow article, comprising mold means including a drag and a cope cooperatively forming an article-defining cavity, passage means connecting said cavity with the exterior of said mold, a solid core positionable in said cavity for forming the hollow of said article, said mold means being movable to rotate said core between generally horizontal and upright positions, a chaplet movable through said passage means and supporting one end of said core when it is horizontal, means supporting the other end of said core and fixing said core against displacement with respect to said drag and cope when said core is upright, means attached to said chaplet to extend through said passage means for removing said chaplet after said core is upright and before said mold means is filled with molding material.

4. An apparatus for making a hollow article comprising a mold including a drag and a cope cooperatively forming an article-defining cavity, a mold core within said cavity defining the hollow of said article, said mold being movable to rotate said core between generally horizontal and upright positions, a chaplet fixing one end of said core with respect to said cope and drag while said core is generally horizontal, flange means at the other end of said core engageable with said cope and drag to fix said core against displacement with respect to said cope and drag when they are assembled and said core is upright, a first passage connecting said cavity and the exterior of said mold and large enough to pass said chaplet therethrough, and means attached to said chaplet and extending through said first passage to permit said chaplet to be withdrawn therethrough, and a second passage connecting said cavity and the exterior of said mold through which liquid mold material may be introduced into said mold.

5. The apparatus as recited in claim 4 wherein said flange means is integral with said core and embedded in said drag and said cope.

References Cited in the file of this patent

UNITED STATES PATENTS 1,657,444   Prince _____ Jan. 24, 1928